United States Patent
Mit et al.

(10) Patent No.: US 9,438,719 B2
(45) Date of Patent: Sep. 6, 2016

(54) DEVICE FOR RENDERING NOTIFICATIONS, AND A METHOD OF CONTROLLING THE RENDERING DEVICE

(71) Applicant: Orange, Paris (FR)

(72) Inventors: Frédéric Mit, Paris (FR); Xavier Nunez Balcells, Paris (FR); Fabrice Fauchoux, Louannec (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/578,280

(22) Filed: Dec. 19, 2014

(65) Prior Publication Data
US 2015/0181013 A1    Jun. 25, 2015

(30) Foreign Application Priority Data
Dec. 23, 2013   (FR) ...................... 13 63480

(51) Int. Cl.
| H04M 1/72 | (2006.01) |
| H04M 1/725 | (2006.01) |
| G04G 17/08 | (2006.01) |
| G09G 5/32 | (2006.01) |
| G04C 3/00 | (2006.01) |

(52) U.S. Cl.
CPC ......... *H04M 1/72527* (2013.01); *G04G 17/08* (2013.01); *G09G 5/32* (2013.01); *G04C 3/001* (2013.01); *G09G 2380/02* (2013.01)

(58) Field of Classification Search
CPC ........................ G06F 1/163; H04M 1/72527
USPC ....................... 455/566, 575.1, 557
See application file for complete search history.

(56) References Cited

U.S. PATENT DOCUMENTS

| 2008/0291225 A1* | 11/2008 | Arneson .............. G06F 3/011 345/698 |
| 2012/0182677 A1 | 7/2012 | Seo |
| 2013/0044215 A1* | 2/2013 | Rothkopf .............. G06F 1/163 348/143 |

FOREIGN PATENT DOCUMENTS

| EP | 2 639 786 A1 | 9/2013 |
| WO | WO 96/21888 A1 | 7/1996 |

OTHER PUBLICATIONS

French Search Report dated Sep. 4, 2014 for French Application No. 1363480 filed Dec. 23, 2013, 2 pages.

* cited by examiner

*Primary Examiner* — John J Lee
(74) *Attorney, Agent, or Firm* — Knobbe Martens Olson & Bear LLP

(57) ABSTRACT

One embodiment is a device having an elongate pliable screen has first and second connection elements that connect together to hold, in a looped shape, a substrate carrying the screen, a receiver unit that receives notifications coming from an external appliance, and a control unit that causes received notifications to be rendered using a first rendering mode or a second rendering mode. The control unit detects the connection state of the first and second connection elements and causes a received notification to be rendered in the first or the second rendering mode as a function of the detected connection state between the connection elements. The first and second rendering modes may comprise respectively: displaying a symbolic or abridged picture indicative of the received notification, or displaying the content of a message conveyed by the received notification, depending on whether the first and second connection elements are connected together or disconnected.

10 Claims, 3 Drawing Sheets

DEVICE FOR RENDERING NOTIFICATIONS, AND A METHOD OF CONTROLLING THE RENDERING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entireties. In particular, the disclosure of French Application 1363480, filed on Dec. 23, 2013, is incorporated by reference herein in its entirety.

BACKGROUND OF THE INVENTION

One embodiment disclosed herein relates to the general field of so-called "connected objects" or "smart objects".

More particularly, it relates to a device that has a pliable screen that can be formed into a loop in order to be worn by a user, and that is adapted to render notifications that are received wirelessly from an external electronic appliance. One embodiment disclosed herein also relates to a method of controlling or driving the device.

There are more and more proposals for "connected objects", i.e. objects having the ability to communicate wirelessly with an external electronic appliance (which may be a router of a communications network, a particular electronic appliance associated with the connected object, or another external electronic device). Below, the terms "smart object", "connected object", "connected bracelet" or "connected band" are used interchangeably, and the term "connected" is used to indicate that the object has the ability to enter into contact with an external appliance in a wireless manner, rather than to specify a particular instantaneous state (connected or disconnected to the external appliance) of the object.

Various connected bracelets or bands have been proposed, in particular objects for collecting data associated with sporting activity of a user and for displaying some of the data on the bracelet (while other data is transmitted for analysis by an application hosted by the user's smartphone). Nevertheless, in general, that kind of connected band is designed to transmit data to an associated external appliance and does not have the ability to warn the user of notifications received by the associated appliance. Below, except where the context requires otherwise, the term "bracelet" or "band" is used to mean any object that can be arranged in the form of a loop so as to be worn by a user, whether around a wrist or some other part of the body or on the clothing of the user.

Also, various commercial and theoretical proposals have been made for connected watches, i.e. watches that have wireless communication means enabling them to connect with an associated smartphone or an associated tablet and that are provided with a certain number of functions based on interacting with the associated external appliance. Some proposed smart watches have a touch screen that resembles a very small tablet and that replaces the "dial" portion of the watch, while conserving a strap of conventional type. Nevertheless, given the small dimensions of a watch dial, the elements displayed on such a screen of an intelligent watch are difficult to read, particularly when it is desired to warn a user of notifications received from the associated appliance.

Among proposed connected bracelets and watches, some are arranged to display images, graphical user interfaces (GUIs), etc. on the strap, and some of those devices make provision for modifying the displayed image as a function of the orientation of the bracelet or the extent to which it is bent or curved. Nevertheless, the proposals that have been made heretofore determine the orientation or the degree of bending of the bracelet by making use of sensors that are of non-negligible complexity and/or overall size.

Given the small amount of space available within a connected bracelet for housing its components, and given the tendency to provide intelligent bracelets with an increasing number of functional modules (GPS, microphone, camera, etc.), a need exists to provide technical means that enable the user to be warned about notifications that are directed to him: in a manner that ensures that the displayed information is readable, but without making use of technical means that are of size and complexity that are troublesome.

OBJECT AND SUMMARY OF THE INVENTION

Certain embodiments of the invention make it possible to improve the above-described situation by proposing a device for rendering notifications, the device comprising:
  a substrate having an elongate pliable screen;
  first and second connection elements connect together to hold the substrate in a looped shape, the screen being substantially curved when the substrate is held in a looped shape;
  a receiver unit for wirelessly receiving notifications coming from an external appliance; and
  a control unit that causes notifications received by the receiver unit to be rendered either in a first rendering mode or in a second rendering mode, wherein the control unit is operative to detect the connected or detached state of the first and second connection elements and to cause a received notification to be rendered in the first or the second rendering mode as a function of the detected connection state of the first and second connection elements.

In certain embodiments of the invention, a connected device can render notifications received from an external appliance in a rendering mode that depends on the connection state between the connection elements that serve to hold the device in a looped shape. As a result, a first notification rendering mode can be used when the connection elements are connected together, as would be the case for example when the device is worn on a user's wrist, and a second rendering mode may be used when the connection elements are disconnected from each other, as would be the case for example when the device is removed from the user's wrist.

The use of two different rendering modes makes it possible to optimize the way in which a notification is rendered relative to the different properties of the pliable screen depending on whether the screen is being worn or not, thus enabling the readability of information to be maximized. Since the notification rendering mode depends on the connected or disconnected state of the connection elements that are provided for holding the device in a looped shape, the rendering mode can be adapted by making use of techniques that are simple and compact.

It should be observed that the term "pliable screen" is used to designate any screen capable of being curved, regardless of whether it is curved in a continuous manner (e.g. when it is a flexible screen), or in discontinuous manner (e.g. when it is a screen made up of hinged pieces), and thus the term "looped shape" is used to designate equally well shapes having a perimeter that is defined by straight-line segments and shapes having a perimeter that is defined by a smooth curve (as well as intermediate shapes).

In certain embodiments of the invention, the first mode of rendering received notifications includes producing an alert (e.g. an alert in the form of vibration or ringing) in order to signal the arrival of the notification. In certain embodiments of the invention, the first mode of rendering received notifications includes displaying on the screen a symbolic picture or an abridged element indicative of the received notification. Since the control unit is adapted to use the first notification rendering mode when the first and second connection elements are connected together, i.e. when it is highly probable that the pliable screen is being worn around one of the user's limbs (or at least is arranged in a looped shape like the substrate carrying it), these ways of implementing the first rendering mode serve to warn the user of a notification sent to the user by means that take account of the fact that the display area visible from any fixed viewpoint is small when the substrate carrying the screen is arranged in the form of a loop, and as a result the screen is substantially curved.

In an embodiment of the invention, the second mode of rendering received notifications comprises displaying the content of a message conveyed by the received notification, along at least a portion of the screen. Since the control unit is adapted to use the second notification rendering mode when the first and second connection elements are detached from each other, i.e. when it is highly probable that the screen is arranged in a flat configuration (or at least is less curved than when the substrate is held in a looped shape), this way of implementing the second rendering mode makes it possible to show the user the content of the notification he has been sent, by means that take advantage of the increased amount of space that is visible when the substrate carrying the screen is not held in a looped shape.

The invention also provides certain implementations of the above embodiment in which the second notification rendering mode includes displaying not only the content of the message, but also a set of response shortcuts to the received notification. Such response shortcuts enable the user to respond simply to messages communicated to the user by the notification. For a connected device that is associated with a smartphone, tablet, etc., that sends it notifications, these implementations of the invention enable the user to respond to those messages without needing to get out the smartphone, tablet, etc. that is associated with the user's connected device.

In certain embodiments of the above examples, the notification rendering device includes an analysis unit for analyzing the received notification, and the analysis unit is designed to select the set of response shortcuts for display as a function of the result of the analysis (when the device is operating in the second notification rendering mode). In some circumstances, the analysis is performed by identifying keywords in a message conveyed by the received notification. When a determined keyword is identified, a set of response shortcuts associated with this keyword can be selected for display in association with the displayed message. Determining which response shortcuts to use based on analysis of the received message enables the user to transmit simplified messages that are nevertheless well-adapted to the semantic content of the received message.

In certain embodiments of the above-mentioned rendering device, the control unit is adapted to detect—after displaying a received notification in one or other of the first and second rendering modes—a change in the connection state between the first and second connection elements and to respond to detecting the change of connection state by changing the rendering mode of the notification to the other one of the first and second rendering modes. In this manner the way of rendering the received notification is adapted in a dynamic manner to optimize it as a function of the shape of the screen.

In certain embodiments of the invention, the above rendering device is made in the form of a bracelet or band.

The present invention also provides a method of controlling a device for rendering notifications received wirelessly from an external appliance, the rendering device including a substrate carrying a pliable screen, and first and second connection elements for connecting together to hold a substrate carrying the pliable screen in a looped shape, the method comprising:
  detecting the connected or disconnected state of the first and second connection elements;
  receiving a notification from the external appliance; and
  causing the received notification to be rendered in a first or second rendering mode as a function of the detected connection state of the first and second connection elements.

BRIEF DESCRIPTION OF THE DRAWINGS

Other features and advantages of the present invention will become clear from the following description of embodiments thereof that are presented for the purposes of illustration, not limitation, with reference to the accompanying drawings, in which:

FIGS. 1A and 1B illustrate an example of a flexible-screen device for use in rendering notifications in accordance with an embodiment of the invention, in which:

FIG. 1A shows the device of this example in a "flat" configuration of the flexible screen, when no notification has been received; and FIG. 1B shows the FIG. 1A device arranged in the form of a loop around a user's wrist;

FIGS. 2A and 2B illustrate the example device of FIG. 1, in which:

FIG. 2A shows the device of this example in a "flat" configuration of the flexible screen, while rendering a notification in a second rendering mode; and FIG. 2B shows the FIG. 2A device while rendering a notification in a first rendering mode (when the device is arranged in a loop around a user's wrist)

DETAILED DESCRIPTION OF EMBODIMENTS

The invention is described below with reference to certain embodiments, in particular in the context of an example of its implementation as a device in the form of an intelligent bracelet or band.

Figure 1A:
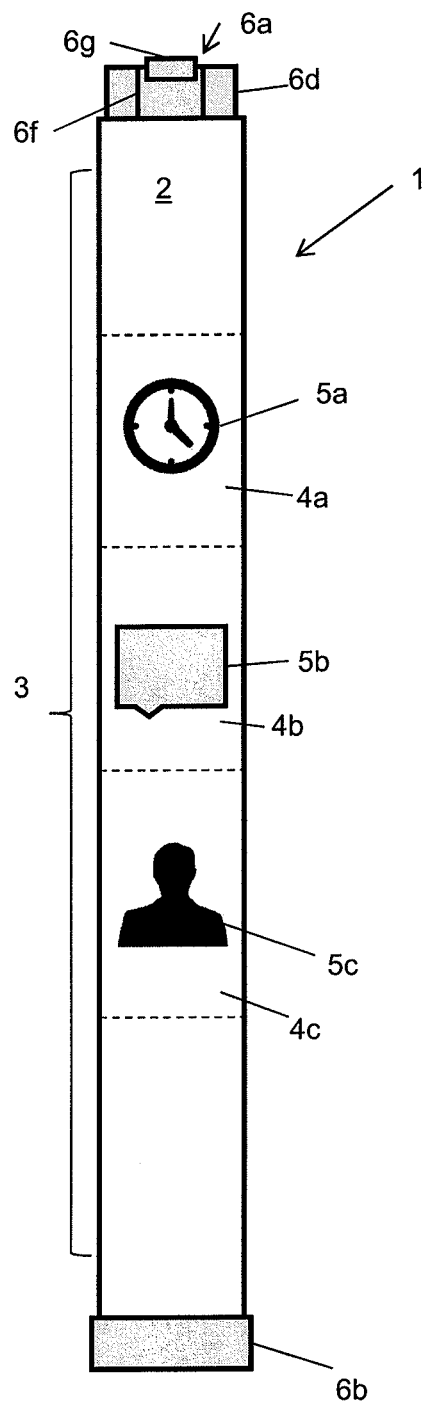
Figure 1B:
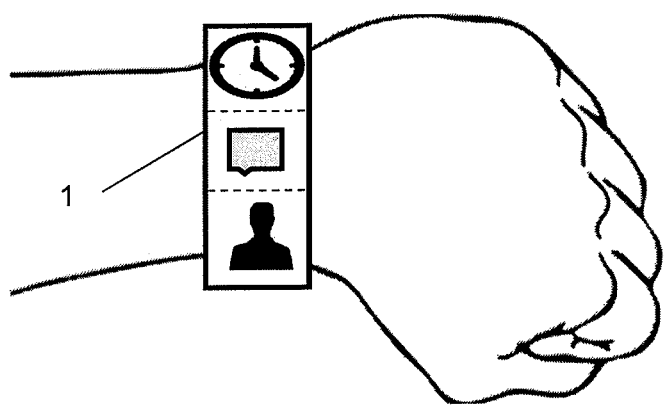

In the example of FIGS. 1A and 1B, an intelligent bracelet 1 in an embodiment of the invention comprises a strap 2 including at least a portion that corresponds to a flexible touch screen 3 on which various items of information can be displayed. The strap 2 corresponds to a substrate carrying the flexible screen 3, and in the particular embodiment shown, the screen 3 may occupy a greater or lesser fraction of the length of the substrate, as desired. In the present example, the screen 3 is adapted to provide simple digital display (by dots), but the invention is not specifically limited by the graphics style used for display purposes. The user may make use of the touch screen 3 as a module for inputting instructions, making selections, or entering other information. A control unit 22 (shown in FIG. 3 and described in greater detail below) controls the display of desired information (images, text, icons, symbols, etc.) on the flexible screen 3.

The invention is not particularly limited having regard to the physical components that are used for providing the strap 2, and the screen 3 of the bracelet 1. Typically, the functional modules that perform the various functions of the bracelet 1 are incorporated within the strap 2. Examples of these functional modules are described in greater detail with reference to FIG. 3.

In the embodiment shown in FIGS. 1A, 1B, 2A and 2B, the control unit 22 controls the display on the screen 3 of a graphics representation having three display zones 4a, 4b, and 4c that are dedicated respectively to a watch function, to a messaging function, and to accessing topics relating to certain people (e.g. family members of the user of the bracelet, members of a particular community, favorites, etc.) and icons 5a, 5b, and 5c recalling the corresponding functions are displayed in these zones. Naturally, the control unit 22 may be designed so as to vary the icons that are displayed at any given moment as a function of various determined criteria. The dotted lines 4x shown in FIG. 1A mark the boundaries between the various display zones 4a, 4b, and 4c. It should be observed that these lines 4x are not necessarily displayed on the screen 3 and that the control unit 22 can control display on the screen 3 in a flexible and dynamic manner. In other words, depending on requirements, the control unit 22 can either subdivide the extent of the flexible screen 3 into various display zones (of various sizes), or else it can treat the screen as a single display region.

In the example shown in FIGS. 1A, 1B, 2A and 2B, when the bracelet 1 is switched on, an initial graphics picture is displayed on the screen 3 regardless of whether the bracelet 1 is laid out flat as shown in FIG. 1A or is closed around a user's wrist as shown in FIG. 1B. This initial picture may always be the same or it may vary (e.g. to correspond with the elements that were being displayed when the bracelet was switched off).

A first connection element 6a and a second connection element 6b serve to hold the bracelet 1 in the form of a loop. The invention is not particularly limited as to the form of the connection elements so long as they serve to keep the bracelet in a looped shape when they are connected together and they enable the loop to be opened when they are detached from one another.

In the example of FIG. 1A, the first and second connection elements 6a and 6b have complementary shapes. In this example, the element 6b defines a recess (not shown) dimensioned to receive the element 6a therein. The element 6a has a plate portion 6d and a spring blade portion 6f. The spring blade portion 6f is connected at one of its ends to the plate 6d and at its other end to a catch 6g. To insert the first connection element 6d into the recess in the second connection 6b, the user presses the element 6a between his/her fingers so as to bring the spring blade portion 6f against the plate 6d. The first connection element 6a can then be slid into the recess in the connection element 6b, after which pressure can be released from the spring blade portion 6f. Because of its resilience, on being released, the spring blade portion 6f pushes the catch 6g against the wall of the recess in the second connection element 6b, thereby serving to hold the plate 6d inside the recess in the second connection element 6b (in particular when a complementary hollow is provided in the wall of the recess). In order to extract the connection element 6d from the recess in the second connection element 6b, the user presses the element 6a once more between fingers so as to bring the spring blade portion 6f back against the plate 6d and detach the catch 6g from the wall of the recess. The user can then slide the first connection element 6a out from the recess in the second connection element 6b.

Among the functions performed by the bracelet 1 in this example there is a function of rendering to the user notifications that have been received wirelessly from an electronic appliance external to the bracelet 1. Naturally, the bracelet 1 can perform other functions as well, depending on the desires of its designer. The present invention is not particularly limited concerning the communications technology used by the bracelet 1 for receiving notifications—depending on the desires of the designer, the bracelet 1 may have Bluetooth™ type wireless reception means; near field communication (NFC) means; wireless local area network (WLAN) reception means in compliance with the 802.11n or another standard; and/or other communications means. Naturally, in certain applications, the bracelet 1 includes a transceiver module for providing two-way communication with the external electronic appliance.

Typically, the bracelet 1 may be used in applications that involve receiving notifications issued by other devices belonging to the same user, e.g. notifications issued by a smartphone, a tablet, an office computer, etc. Nevertheless, the invention is not limited to this situation: the bracelet 1 may be used in applications in which it receives notifications from a wireless network router or from any other electronic appliance having a wireless communications function compatible with its own function(s). Depending on the application, the bracelet 1 may serve to warn the user of SMS or email messages that have been received, or of Facebook messages or Twitter messages from contacts, etc.

In this embodiment of the invention, the bracelet 1 has two modes of rendering notifications it has received, and the rendering mode that is used at any given moment depends on the connected/disconnected state of the first and second connection elements 6a and 6b.

Figure 2A:
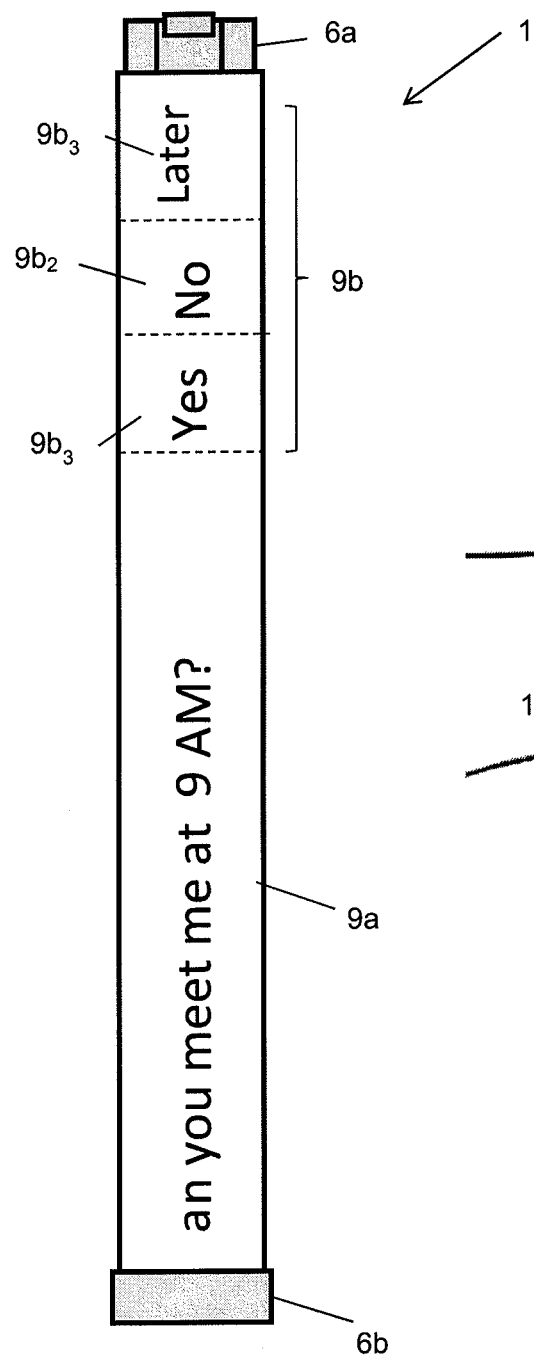
Figure 2B:
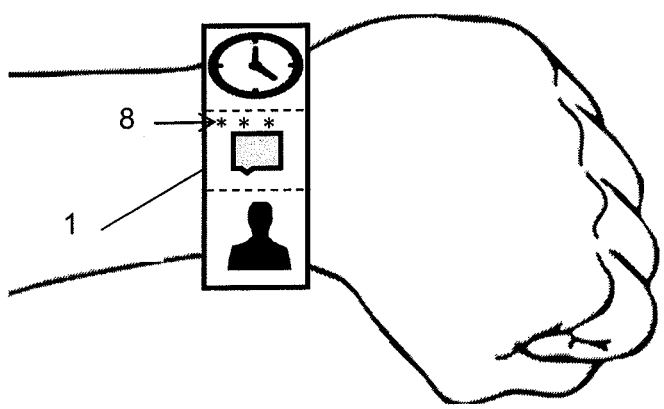

If a notification is received at a moment when the bracelet 1 is held in its state closed around the user's wrist, then the connection elements 6a and 6b are connected together and thus a first rendering mode is used for the notification. FIG. 2B illustrates an example.

As shown in FIG. 2B, in this example, the first mode for rendering the notification comprises displaying a symbolic representation 8 (here in the form of at least one star) in the display zone 4b that is allocated to messaging, this symbolic representation 8 serving to indicate that a notification has been received. In this example, the number of stars in the symbolic representation 8 for receiving a notification varies as a function of the priority given to the received notification. The control unit 22 may use various criteria to decide on the priority to be given to the received notification and can thus determine the corresponding number of stars to be displayed. For example, a high priority may be given as a function of the sender associated with the notification (for example depending on the person who has sent the email that is being notified to the bracelet, the person who has posted a message on Twitter, with the text of the message being included in the notification, etc.), as a function of the urgency of the notification, or as a function of the intensity of the request (e.g. depending on an urgency indicator included in the notification, depending on an indication of the time at which the message was sent as included in the notification, etc.), as a function of the amount of data communicated in the notification, etc. The criteria determining the priority that is to be given may be predetermined, e.g.

by the manufacturer of the bracelet 1 suitably programming the control unit 22; however other possibilities also exist. For example, the bracelet 1 in this example includes a user interface (see below) and the bracelet 1 may be designed to enable the user to make use of the user interface in order to adjust the parameters that determine what priority is given.

It should be observed that in this implementation of the first notification rendering mode, as used when the connection elements 6a and 6b are connected together, the user is provided with a warning that the notification has arrived in a manner that requires very little surface area on the bracelet 1. As can be seen in FIG. 2B, when the connection elements 6a and 6b are connected together, the visible portion of the bracelet 1 is quite limited and rendering in symbolic form optimizes the display capacities of the bracelet 1 at that moment. It should be observed that the "visible portion" is used herein to designate the area of the bracelet 1 that can be seen at a single glance by a person looking at it from a fixed viewpoint (e.g. when the user glances at his or her wrist).

Although the example of FIG. 2B shows a first notification rendering mode that comprises displaying a symbolic representation indicating the arrival of a notification in association with an icon that is dedicated to messaging, the invention is not limited to this particular way of implementing the first notification rendering mode. Instead of displaying a symbolic picture indicating the arrival of a notification in association with a graphics element that is already on display on the screen 3, or in addition to that, the control unit 22 may cause the first notification rendering mode to operate in such a manner as to include one or more of the following elements:

displaying an icon that does not form part of the initial graphics picture;

changing the way in which an icon or some other graphics element associated with notifications is shown (e.g. changing the color of the icon 5b, increasing its brightness, making the icon flash, etc.);

displaying text characters indicating that a notification has been received; and/or displaying a highly abridged version of the notification itself, etc.

Furthermore, the first notification rendering mode may include producing a non-visible warning signal in order to warn the user that a notification has been received. For example, the bracelet 1 may include a buzzer module (not shown) that is controlled by the control unit 22 to vibrate in the event of the bracelet 1 receiving a notification. In similar manner, the bracelet 1 may include a loudspeaker (not shown) that is controlled by the control unit 22 to issue a predetermined sound in the event of the bracelet 1 receiving a notification.

In summary, when the connection elements 6a and 6b are connected together, the control unit 22 organizes the rendering of the notification, as received by the bracelet 1, in compliance with a first rendering mode that serves to appropriately alert the user of the bracelet 1 in spite of the small area of the pliable screen 3 that is visible as a result of the curvature of the screen 3.

If a notification is received at the moment when the connection elements 6a and 6b are detached from each other, e.g. because the bracelet 1 is laid out flat or is stretched between the user's two hands, then a second notification rendering mode may be used. FIG. 2A shows an example.

In the example of FIG. 2A, the control unit 22 organizes the rendering of a notification in compliance with a second rendering mode in which the above-described graphics picture is replaced by displaying the content of a message indicated by the notification. More precisely, as can be seen in FIG. 2A, in this example, an elongate region 9a of the flexible screen 3 is used in the second rendering mode to display the message conveyed by the received notification. The elongate region 9a extends along the length of the flexible screen 3 and occupies most of the length of the strap 2. In this way, when the bracelet is not closed as a loop, there is a region of greater size available for displaying the content of the message, in particular a region of size that is greater than the area of the bracelet 1 that is visible when it is closed in a loop. Depending on the desires of the designer, the control unit 22 may be adapted to display the content of the message in scrolling manner, e.g. when the length of the region 9a is not sufficient for displaying the entire message using a font of size that is large enough to ensure that the message is readable. In a variant, the control unit 22 is adapted to display a long message of this kind in pieces, and to advance from one piece to another as a function of a trigger event (e.g. the user sliding a finger along the touch screen 3, the expiry of a determined time interval, etc.).

In the example of FIG. 2A, the rendering of a notification in the second rendering mode comes to an end when the connection elements 6a and 6b are once more connected together. However the invention is not particularly limited as to the moment at which the rendering of a notification comes to an end. For example, the rendering of a notification in the first or the second rendering mode may terminate at the end of a determined time period (e.g. a few seconds, a period associated with the urgency or the importance of the content, etc.), as a result of the user performing an action, etc. In a variant, the rendering of a notification in the first rendering mode comes to an end when the content of the notification is rendered using the second rendering mode.

In the example of FIG. 2A, the second mode of rendering a received notification includes displaying a set of response shortcuts 9b in association with the message displayed in the region 9a of the screen. FIG. 2A shows a set of response shortcuts 9b comprising a first shortcut 9b1 corresponding to the response "yes", a second shortcut 9b2 corresponding to the response "no", and a third shortcut 9b3 corresponding to the response "later". By touching one of these response shortcuts, the user can send a response in simplified manner to the displayed message. For example, if the user touches the portion of the touch screen that is displaying the response shortcut 9b2, then the bracelet will send the "no" response to the received message, this response being sent to the sender of the message, in particular via the smartphone or other external device that sent the notification to the bracelet.

Naturally, the number of shortcuts displayed may lie in the range zero up to some arbitrary number, e.g. as selected by the designer of the bracelet. Nevertheless, if the number of response shortcuts becomes too great, either it is necessary to use a font of size that is very small in order to show the message and the simplified responses, or else it is necessary to reduce the space available for displaying the message (to make space available for displaying the response shortcuts). It is possible to ensure that the message and the proposed simplified responses are readable by limiting the number of response shortcuts making up the set 9b.

Various approaches are possible for deciding on the simplified responses that are to form part of the set 9b of response shortcuts. In a first approach, the response shortcuts are always the same and correspond to the commonest responses (which may be determined by statistical analysis). In a second approach, the response shortcuts made available to the user are adapted to the content of the displayed message, in particular based on the result of semantic analysis of the message. An implementation of this second approach comprises performing keyword analysis on the received message, in particular analyzing the first words of the message. For example, when the first words of the message correspond to "can you . . . ", typically the control unit 22 includes in the set 9b of response shortcuts, at least the two simplified responses "yes" and "no".

The bracelet 1 includes a module (see FIG. 3) for detecting connection and separation of the first and second connection elements 6a and 6b. The invention is not particularly limited concerning the way in which the connected/disconnected state of the connection elements is detected.

Certain embodiments of the invention make provision for establishing an electrical contact between conductors when the first and second connection elements are connected together and for breaking this electrical contact when the connection elements are detached from each other. This applies to the bracelet in the example of FIGS. 1A, 1B, 2A and 2B when the connection elements 6a and 6b include metal components that come into contact when the plate 6d is inserted in the recess in the second connection element 6b. In embodiments of this kind, the connection elements serve to make and break contact that is both mechanical and electrical. The making and the breaking of this electrical contact corresponds to a switch function having "closed" and "open" states that correspond respectively to the "connected" and "separated" states of the first and second connection elements 6a and 6b. Typically, this switch is incorporated in a circuit for selecting the notification rendering mode, in order to select the notification rendering mode as a function of the connection state of the connection elements 6a and 6b.

Figure 3:
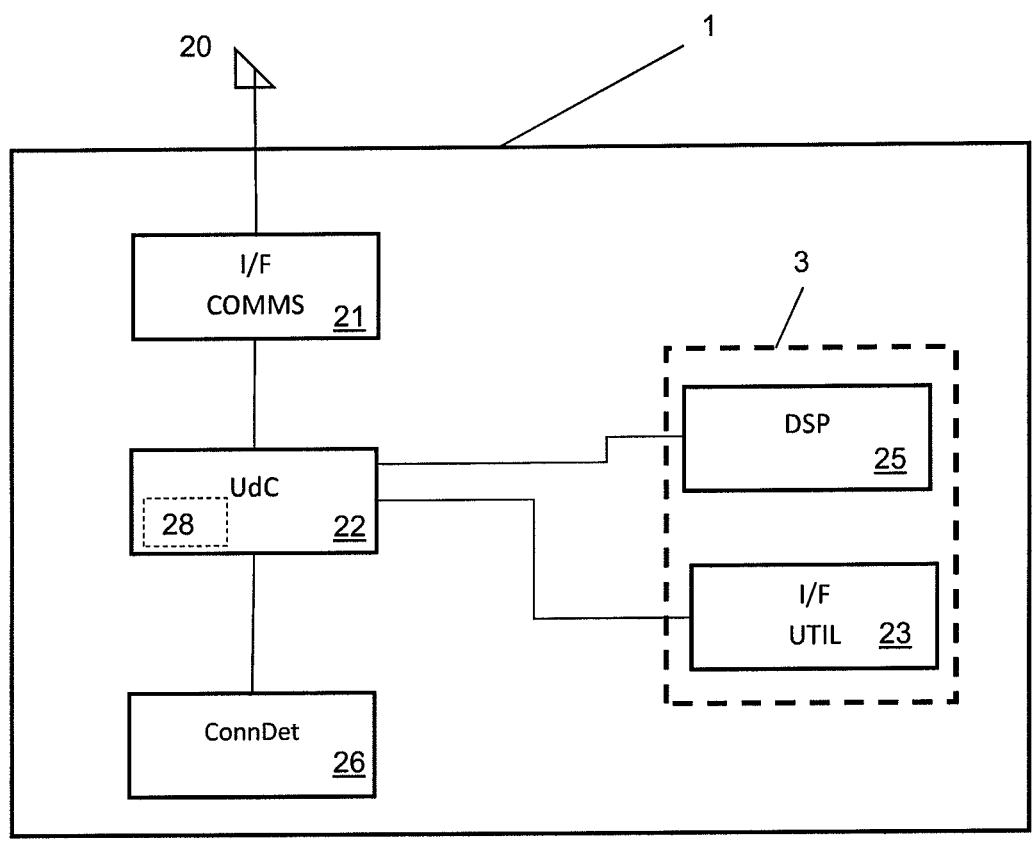
FIG. 3 is a functional diagram showing an example of functional modules of the device in the embodiment of FIGS. 1A, 1B, 2A and 2B.

The present invention is not particularly limited concerning the functional modules that are used for providing the functions of the above-described bracelet 1. FIG. 3 is a block diagram showing a combination of functional modules used in an implementation of the bracelet 1. The bracelet has an antenna 20 connected to a communications interface 21 that provides the two-way wireless communications function between the bracelet 1 and an external appliance (e.g. the user's smartphone). The control unit 22 controls the operation of the bracelet and is connected to the communications interface 21. Typically, the control unit 22 has a processor that communicates with memories or other storage modules (not shown) and also with other functional modules, e.g. by means of a bus (not shown). A display module 25 and a user interface 23 are associated with the screen 3 and are connected to the control unit 22. A battery or some other power supply module (not shown) powers the electrical components of the bracelet 1. In certain embodiments of the invention, the control unit 22 includes a unit 28 for analyzing notifications, this unit providing results that enable the control unit 22 to select an appropriate set of response shortcuts.

Although the above description relates to particular embodiments of the present invention, the person skilled in the art will understand that various modifications and alterations may be performed without thereby going beyond the ambit of the present invention.

For example, although the above description of certain embodiments of the device of the invention relate to a bracelet having a flexible screen, other types of screen could be used. For example, the device could use a screen made up of hinged pieces, i.e. a screen made up of pieces that are hinged relative to one another. It should be observed that in association with such embodiments of the invention, the term "substantially curved" relates to the screen having a bent shape.

As another example, although, in description above relating to the first rendering mode, reference was made to a number of displayed stars being varied in order to indicate a level of priority assigned to an incoming notification, it will be understood that the level of priority of a notification may be indicated in a manner that is adapted to the nature of the alert that is generated in the first rendering mode. Thus, for example, when the alert involves changing the color of an icon, the hue or intensity of the new color may be varied depending on the priority assigned to the notification; when the alert involves increasing a brightness, the degree of brightness change may depend on the level of priority, and so on.

What is claimed is:

1. A device for rendering notifications, the device comprising:
   a substrate having an elongate pliable screen;
   first and second connection elements that connect together to hold the substrate in a looped shape, the screen being substantially curved when the substrate is held in a looped shape;
   a receiver unit for wirelessly receiving notifications coming from an external appliance; and
   a control unit that causes notifications received by the receiver unit to be rendered either in a first rendering mode or in a second rendering mode, wherein the control unit is operative to detect whether the first and second connection elements are connected together or detached from one another and to cause a received notification to be rendered in the first or the second rendering mode as a function of detection of the first and second connection elements being connected together or detached from one another, respectively.

2. A rendering device according to claim 1, wherein the control unit is operative, when the first and second connection elements are connected together, to use a first rendering mode including producing a warning in the form of vibration or ringing to indicate the arrival of the notification.

3. A rendering device according to claim 1, wherein the control unit is operative, when the first and second connection elements are connected together, to use a first rendering mode including displaying a symbolic picture or an abridged element indicative of the received notification.

4. A rendering device according to claim 1, wherein the control unit is operative, when the first and second connection elements are disconnected from each other, to use a second rendering mode including displaying, along at least a portion of the screen, the content of a message conveyed by the received notification.

5. A rendering device according to claim 4, wherein the control unit is operative to use a second rendering mode including displaying a set of response shortcuts to the received notification.

6. A rendering device according to claim 5, further comprising an analysis unit for analyzing the received notification, the analysis unit being operative to select the set of response shortcuts for display as a function of the result of the analysis.

7. A rendering device according to claim 6, wherein the unit for analyzing the received notification is operative to identify at least one keyword in a message conveyed by the received notification and, in the event of identifying a determined keyword, to select a set of response shortcuts associated with said keyword.

8. A rendering device according to claim 1, wherein the control unit is operative to detect a change in the connection state of the first and second connection elements after rendering a received notification in one of the first and second rendering modes and to respond to detecting the change of connection state by changing the rendering mode of the notification to the other one of the first and second rendering modes.

9. A smart band including a pliable screen device according to claim 1.

10. A method of controlling a device for rendering notifications received wirelessly from an external appliance, the rendering device including a substrate carrying a pliable screen, and first and second connection elements that connect together to hold the substrate in a looped shape, the method comprising:

detecting whether the first and second connection elements are connected together or detached from one another;

receiving a notification from the external appliance; and causing the received notification to be rendered in a first or second rendering mode as a function of detection of the first and second connection elements being connected together or detached from one another, respectively.

* * * * *